United States Patent
Hirooka et al.

(10) Patent No.: US 12,122,353 B2
(45) Date of Patent: Oct. 22, 2024

(54) CONTROL DEVICE FOR HYBRID VEHICLE

(71) Applicant: TOYOTA JIDOSHA KABUSHIKI KAISHA, Toyota (JP)

(72) Inventors: Shigemasa Hirooka, Susono (JP); Koichi Kitaura, Odawara (JP); Yoshio Yamashita, Susono (JP); Shingo Korenaga, Nagoya (JP); Katsuhiro Ito, Nagoya (JP); Hikaru Shiozawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 264 days.

(21) Appl. No.: 17/657,868

(22) Filed: Apr. 4, 2022

(65) Prior Publication Data
US 2022/0332305 A1  Oct. 20, 2022

(30) Foreign Application Priority Data
Apr. 20, 2021 (JP) ................................. 2021-070952

(51) Int. Cl.
*B60W 20/13* (2016.01)
*F01N 3/20* (2006.01)

(52) U.S. Cl.
CPC ........... *B60W 20/13* (2016.01); *F01N 3/2013* (2013.01); *B60W 2510/068* (2013.01); *B60W 2510/244* (2013.01)

(58) Field of Classification Search
None
See application file for complete search history.

(56) References Cited

U.S. PATENT DOCUMENTS

| | | | | |
|---|---|---|---|---|
| 9,035,489 B2* | 5/2015 | Yamada | ............... | B60L 15/2045 307/10.7 |
| 9,114,698 B2* | 8/2015 | Amano | ................ | B60L 3/0007 |
| 9,895,994 B2* | 2/2018 | Morimoto | ............... | B60L 50/16 |
| 10,040,356 B2* | 8/2018 | Jojima | ................... | B60L 3/0046 |
| 10,668,817 B2* | 6/2020 | Andoh | ....................... | B60L 7/16 |
| 11,532,945 B2* | 12/2022 | Hirooka | ................ | B60W 20/16 |
| 2003/0172643 A1 | 9/2003 | Suzuki | | |
| 2007/0187158 A1* | 8/2007 | Muta | ....................... | B60K 28/16 180/197 |
| 2016/0159337 A1* | 6/2016 | Hisano | ..................... | B60K 6/20 180/65.265 |
| 2019/0363406 A1* | 11/2019 | Yamada | ............... | H02J 7/00712 |
| 2020/0232372 A1* | 7/2020 | Obuchi | ..................... | F01N 9/00 |
| 2021/0135483 A1* | 5/2021 | Hirooka | ................ | F01N 3/2006 |
| 2021/0189936 A1* | 6/2021 | Korenaga | ................. | F01N 9/00 |
| 2021/0215078 A1* | 7/2021 | Hirooka | ................ | F01N 3/2026 |

FOREIGN PATENT DOCUMENTS

| | | |
|---|---|---|
| JP | 2003-269208 A | 9/2003 |
| JP | 2020-196408 A | 12/2020 |

* cited by examiner

*Primary Examiner* — Redhwan K Mawari
*Assistant Examiner* — Kai Nmn Wang
(74) *Attorney, Agent, or Firm* — Oblon, McClelland, Maier & Neustadt, L.L.P.

(57) ABSTRACT

A control device starts supply of electric power to a catalyst device when a state of charge of a main battery decreases to a value which is equal to or less than an optimal power-supply state of charge set based on a travel load while a vehicle is traveling in an EV travel mode. The control device corrects input electric power of the catalyst device to a value less than the value at the time of starting of supply of electric power when the travel load decreases after the supply of electric power has been started.

5 Claims, 4 Drawing Sheets

CONTROL DEVICE FOR HYBRID VEHICLE

CROSS-REFERENCE TO RELATED APPLICATION

This application claims priority to Japanese Patent Application No. 2021-070952 filed on Apr. 20, 2021, incorporated herein by reference in its entirety.

BACKGROUND

1. Technical Field

The present disclosure relates to a control device for a hybrid vehicle including two types of power sources such as an engine and a motor.

2. Description of Related Art

A hybrid vehicle including two types of travel modes of an EV travel mode and a hybrid travel mode is known. The EV travel mode is a travel mode in which the engine is stopped and the hybrid vehicle travels using only the power of the motor. The hybrid travel mode is a travel mode in which the hybrid vehicle travels using both the engine and the motor as power sources. The hybrid vehicle travels in the EV travel mode when a state of charge of a battery has a margin. When the state of charge of the battery is equal to or less than a predetermined value, the travel mode is switched from the EV travel mode to the hybrid travel mode.

A device described in Japanese Unexamined Patent Application Publication No. 2003-269208 (JP 2003-269208 A) is known as a control device for a hybrid vehicle. The control device described in the publication is applied to a hybrid vehicle including an engine in which an electrically heated type catalyst device is provided in an exhaust gas passage and a motor that generates power with supply of electric power from a battery as traveling power sources. The control device starts electric heating of the catalyst device when a state of charge of the battery is equal to or less than a predetermined pre-heating determination value in EV travel in which the engine is stopped and the hybrid vehicle travels using only the motor as a power source. The control device starts the engine when the state of charge of the battery is equal to or less than a predetermined start determination value less than the pre-heating determination value. In the control device according to the related art, heating of the catalyst device before the engine is started, that is, so-called pre-heating, is performed as described above.

SUMMARY

When a rate of decrease of the state of charge of the battery after pre-heating of the catalyst device has been started is lower than assumed, there may be a long time from completion of pre-heating to starting of the engine. In this case, since the catalyst device cools down until the engine is started and thus electric heating needs to be performed again, efficiency of electric heating may decrease.

A control device for a hybrid vehicle according to an aspect of the present disclosure is a control device for a hybrid vehicle including an engine in which an electrically heated type catalyst device which is heated with supply of electric power is provided in an exhaust gas passage and a motor that generates power with supply of electric power from a battery as traveling power sources and having a first travel mode in which only the motor is used as the traveling power source and a second travel mode in which at least the engine is used as the traveling power source as travel modes. The control device is configured to perform: a switching process of switching the travel mode to the second travel mode when a state of charge of the battery is equal to or less than a predetermined mode-switching state of charge while the hybrid vehicle is traveling in the first travel mode; a pre-heating process of starting supply of electric power to the catalyst device when the state of charge of the battery is equal to or less than an optimal power-supply state of charge greater than the mode-switching state of charge, the pre-heating process being a process of performing electric heating of the catalyst device while the hybrid vehicle is traveling in the second travel mode; a calculation process of calculating a value which is greater when a travel load of the hybrid vehicle is large than when the travel load is small as a value of the optimal power-supply state of charge; and a correction process of decreasing input electric power of the catalyst device when the travel load is less than that when supply of the electric power to the catalyst device is started.

The engine is stopped in the first travel mode, but is likely to be started when the second travel mode is started. The control device performs the pre-heating process of performing electric charging of the catalyst device in order to warm up the catalyst device until the second travel mode is started.

A rate of decrease of the state of charge of the battery is calculated from the travel load of the hybrid vehicle while the hybrid vehicle is traveling in the first travel mode. When the rate of decrease of the state of charge is known, a timing at which the state of charge reaches a mode-switching determination value can be predicted. Accordingly, by determining the state of charge at which supply of electric power is started according to the travel load, the start timing of supply of electric power to the catalyst device is determined such that warm-up of the catalyst device is completed at the time of starting of the second travel mode. The control device calculates the state of charge of the battery at which the supply of electric power is started as the optimal power-supply state of charge.

When the travel load decreases and power consumption of the motor decreases after supply of electric power has been started, the start timing of the second travel mode is later than that predicted at the time of starting of supply of electric power. On the other hand, when the input electric power of the catalyst device subjected to electric heating is decreased, the timing at which warm-up of the catalyst device is completed is delayed. Therefore, the control device decreases the input electric power of the catalyst device when the travel load becomes less than that at the time of starting of supply of electric power to the catalyst device. Accordingly, even when the travel load decreases after supply of electric power has been started, supply of electric power to the catalyst device can be performed such that warm-up is completed at an appropriate timing associated with starting of the second travel mode. As a result, it is possible to enhance efficiency of electric heating of the catalyst device before the engine is started.

In the control device for a hybrid vehicle, when the value of the optimal power-supply state of charge at the time of starting of supply of electric power to the catalyst device in the pre-heating process is defined as a power-supply initial value of the optimal power-supply state of charge and a value of the optimal power-supply state of charge recalculated through the calculation process after supply of electric power to the catalyst device has been started is defined as a recalculated value of the optimal power-supply state of charge, the correction process may be a process of setting the input electric power to a value which is less when a difference acquired by subtracting the recalculated value from the power-supply initial value is large than when the difference is small. When the process of correcting the input electric power is performed after supply of electric power has been started in this way, it is possible to adjust the warm-up completion timing of the catalyst device by electric heating with a delay of the start timing of the second travel mode following the decrease in travel load. In this case, the correction process may be a process of setting the input electric power to a value at which a ratio of the input electric power to a value at the time of starting of supply of electric power is "ΔS/(S0−SHV)." Here, "S0" represents the power-supply initial value, "ΔS" represents the difference acquired by subtracting the recalculated value from the power-supply initial value, and "SHV" represents the mode-switching state of charge.

The travel load may decrease greatly after supply of electric power has been started. When the input electric power is corrected according to the great decrease in travel load, the input electric power may become less than energy dissipated from the catalyst device due to emission of heat to outside air or the like and thus the temperature of the catalyst device may not be increased. Accordingly, in the control device, the pre-heating process may include stopping supply of electric power to the catalyst device when the difference is greater than a predetermined stop determination value.

In the control device, the switching process may include switching the travel mode to the second travel mode at the time of completion of warm-up of the catalyst device by the electric heating when the state of charge is equal to or less than the mode-switching state of charge and the warm-up of the catalyst device has not been completed. In this case, the second travel mode is not started in a state in which warm-up of the catalyst device has not been completed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
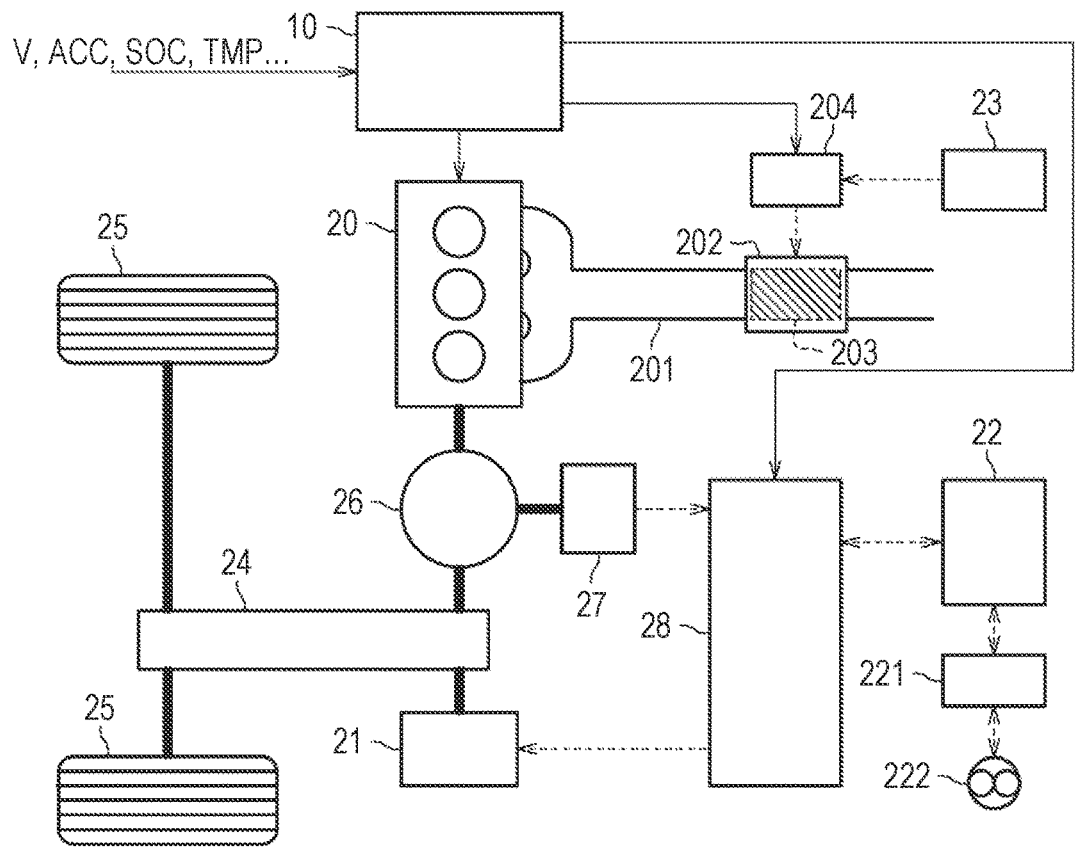
FIG. 1 is a diagram schematically illustrating a configuration of a control device for a hybrid vehicle according to an embodiment.

Hereinafter, a control device for a hybrid vehicle according to an embodiment of the present disclosure will be described in detail with reference to FIGS. 1 to 5.
Configuration of Hybrid Vehicle First, a configuration of a hybrid vehicle to which a control device 10 according to this embodiment is applied will be described below with reference to FIG. 1. As illustrated in FIG. 1, a hybrid vehicle includes an engine 20 and a motor 21 as power sources. A main battery 22 that supplies electric power for traveling and an auxiliary-machine battery 23 that supplies electric power to auxiliary machinery of the engine 20 or the like are mounted in the hybrid vehicle. A charging connector 222 for external charging is connected to the main battery 22 via an orthogonal conversion circuit 221. In this way, the control device 10 according to this embodiment is applied to a plug-in hybrid vehicle that can be externally charged.

An electrically heated type catalyst device 202 that is heated with supply of electric power thereto is provided in an exhaust gas passage 201 of the engine 20. A substrate 203 that carries a catalyst for cleaning exhaust gas is accommodated in the catalyst device 202. A conductive porous member that generates heat with supply of electric power thereto is used as the substrate 203. The substrate 203 of the catalyst device 202 is connected to the auxiliary-machine battery 23 via a power control circuit 204.

The motor 21 generates power with supply of electric power from the main battery 22. That is, in this embodiment, the main battery 22 of the two batteries serves as a battery that supplies electric power to the motor 21. The motor 21 is connected to driving wheels 25 via a reduction gear mechanism 24. On the other hand, the engine 20 is connected to the driving wheels 25 via a planetary gear mechanism 26 and the reduction gear mechanism 24.

A generator 27 is connected to the planetary gear mechanism 26. The generator 27 generates electric power using a driving force from the engine 20 or the driving wheels 25. The generator 27 also serves as a starter that rotationally drives the engine 20 when the engine 20 is started. The generator 27 at that time serves as a motor that generates power with supply of electric power from the main battery 22.

The generator 27 and the motor 21 are connected to the main battery 22 via an inverter 28. AC electric power generated by the generator 27 is converted to DC electric power by the inverter 28 and the main battery 22 is charged therewith. DC electric power of the main battery 22 is converted to AC electric power by the inverter 28 and is supplied to the motor 21.

The control device 10 is configured as an electronic control unit for vehicle control including a CPU, a ROM, and a RAM. Detection signals from sensors provided in constituent parts of the hybrid vehicle are input to the control device 10. Examples thereof include detection signals such as a vehicle speed V, an accelerator pedal operation amount ACC, a state of charge SOC of the main battery 22, and a catalyst temperature TMP of the catalyst device 202. The control device 10 controls an operation state of the engine 20. The control device 10 controls powering/regenerative torques of the motor 21 and the generator 27 through control of driving of the inverter 28.
Process of Switching Travel Mode When the hybrid vehicle is traveling, the control device 10 calculates a required driving force which is a required value of a driving force for the hybrid vehicle from the vehicle speed V and the accelerator pedal operation amount ACC. The control device 10 controls driving of the engine 20, the motor 21, and the generator 27 such that a driving force corresponding to the required driving force is obtained.

When the state of charge SOC of the main battery 22 has a sufficient margin, the control device 10 performs an EV travel mode in which only the motor 21 is used as a traveling power source. At that time, the control device 10 maintains the engine 20 in a stopped state. The control device 10 performs driving control of the inverter 28 such that the motor 21 generates a torque from which a driving force corresponding to the required driving force can be acquired.

When the state of charge SOC of the main battery 22 is less than a predetermined value while the hybrid vehicle is traveling in the EV travel mode, the control device 10 switches the travel mode of the hybrid vehicle from the EV travel mode to the hybrid travel mode (hereinafter referred to as an HV travel mode). The HV travel mode is a travel mode in which both the engine 20 and the motor 21 are used as a traveling power source. In the HV travel mode, the control device 10 performs charging/discharging control of the main battery 22 such that the state of charge SOC of the main battery 22 is maintained as a value in a predetermined range. Charging of the main battery 22 in the charging/discharging control is performed by regenerative power generation of the motor 21. Discharging of the main battery 22 in the charging/discharging control is performed by powering of the motor 21. The control device 10 calculates a driving force required for regenerative power generation of the motor 21 or a driving force generated by powering as a value of a battery-required driving force. The control device 10 performs output control of the engine 20 such that a driving force corresponding to the sum of the required driving force and the battery-required driving force is obtained. When the sum of the required driving force and the battery-required driving force is equal to or less than 0, the control device 10 stops the engine 20. In this embodiment, the EV travel mode corresponds to a first travel mode in which only the motor is used as a traveling power source. The HV travel mode corresponds to a second travel mode in which at least the engine is used as a traveling power source.

Figure 2:
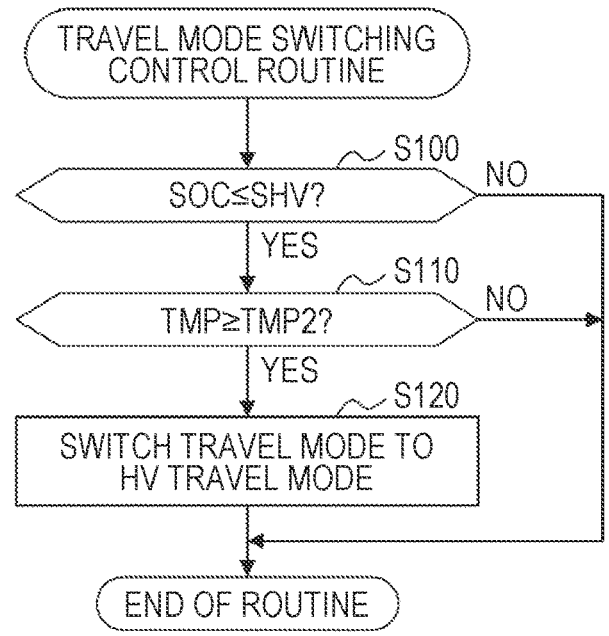
FIG. 2 is a flowchart illustrating a process sequence of a travel mode switching control routine which is performed by the control device according to the embodiment.

FIG. 2 is a flowchart illustrating a travel mode switching routine which is performed by the control device 10 to switch the travel mode from the EV travel mode to the HV travel mode. The control device 10 repeatedly performs this routine every predetermined control cycle while the hybrid vehicle is traveling in the EV travel mode.

When this routine is started, first, the control device 10 determines whether the state of charge SOC of the main battery 22 is equal to or less than a predetermined mode-switching state of charge SHV in Step S100. When the state of charge SOC is equal to or greater than the mode-switching state of charge SHV (NO), the control device 10 ends this routine without any performance. On the other hand, when the state of charge SOC is equal to or less than the mode-switching state of charge SHV (YES), the control device 10 causes the routine to proceed to Step S110.

When the routine proceeds to Step S110, the control device 10 determines whether the catalyst temperature TMP is equal to or greater than a predetermined cleaning start temperature TMP2 in Step S110. When the catalyst temperature TMP is less than the cleaning start temperature TMP2 (NO), the control device 10 ends this routine without performing any more process. On the other hand, when the catalyst temperature TMP is equal to or greater than the cleaning start temperature TMP2 (YES), the control device 10 switches the travel mode from the EV travel mode to the HV travel mode in Step S120.

In this way, the control device 10 switches travel mode from the EV travel mode to the HV travel mode based on the premise that the state of charge SOC of the main battery 22 is less than the mode-switching state of charge SHV and the catalyst temperature TMP is equal to or greater than the cleaning start temperature TMP2. The cleaning start temperature TMP2 is set to the following temperature.

A catalyst carried by the catalyst device 202 is inactive when the temperature is low. At this time, the catalyst device 202 is in a state in which an exhaust gas cleaning ability is not developed. When the catalyst temperature TMP is increased in this state, the catalyst starts its activation and the catalyst device 202 develops a predetermined exhaust gas cleaning ability. The value of the catalyst temperature TMP at that time is set as the cleaning start temperature TMP2. Here, a state in which the catalyst temperature TMP is equal to or greater than the cleaning start temperature TMP2 is referred to as a state in which the catalyst device 202 has been partially warmed up.

When the catalyst temperature TMP is further increased from the cleaning start temperature TMP2, the catalyst is completely activated and the catalyst device 202 develops the maximum exhaust gas cleaning ability. In the following description, the catalyst temperature TMP at that time is referred to as a catalyst activation temperature TMP1. Here, a state in which the catalyst temperature TMP is equal to or greater than the catalyst activation temperature TMP1 is referred to as a state in which the catalyst device 202 has been completely warmed up.

The engine 20 is stopped in the EV travel mode. When the travel mode is switched from the EV travel mode to the HV travel mode, there is a likelihood that the engine 20 will be started at that time. On the other hand, when the catalyst temperature TMP at the time of starting of the engine 20 is equal to or greater than the cleaning start temperature TMP2, the catalyst device 202 develops a predetermined exhaust gas cleaning ability immediately after the engine has been started. On the other hand, in this embodiment, a situation in which the catalyst temperature TMP is equal to or greater than the cleaning start temperature TMP2, that is, a situation in which partial warm-up of the catalyst device 202 has been completed, is added to conditions for switching from the EV travel mode to the HV travel mode. Accordingly, the engine 20 is normally started in a state in which a predetermined exhaust gas cleaning ability is developed.

Power Supply Control of Catalyst Device

The control device 10 performs a pre-heating process of electrically heating the catalyst device 202 before the travel mode is switched from the EV travel mode to the HV travel mode. Power supply control of the catalyst device 202 for the pre-heating process will be described below.

Figure 3:
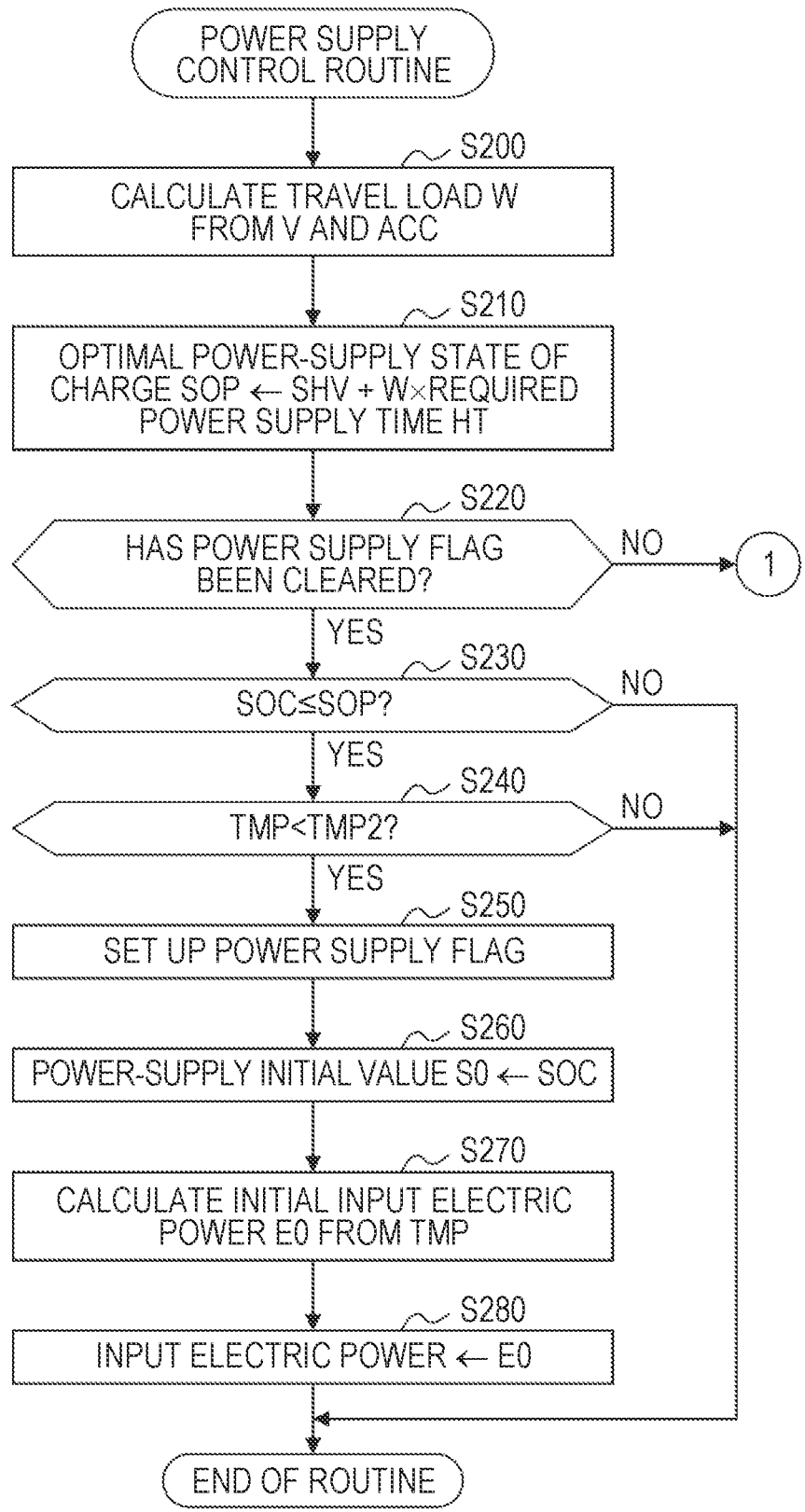
FIG. 3 is a flowchart illustrating a part of a process sequence of a power supply control routine which is performed by the control device according to the embodiment.
Figure 4:
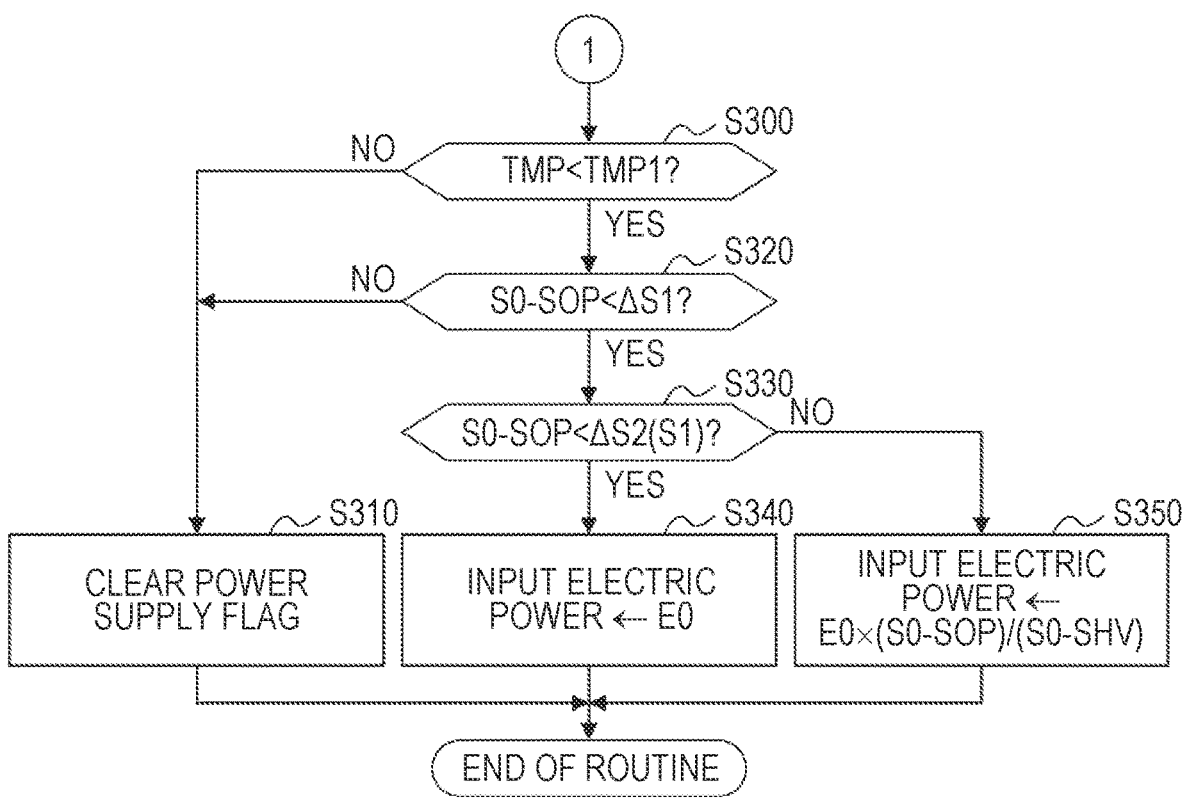
FIG. 4 is a flowchart illustrating the remaining part of the process sequence of the power supply control routine.

FIGS. 3 and 4 illustrate a flowchart of a power supply control routine which is performed by the control device 10 for such power supply control. The control device 10 repeatedly performs this routine every predetermined control cycle while the hybrid vehicle is traveling the EV travel mode.

After this routine has ended, the control device 10 ascertains whether a power supply flag is set up. Then, when the power supply flag is cleared, the control device 10 stops supply of electric power to the catalyst device 202. On the other hand, when the power supply flag is set up, the control device 10 performs supply of electric power to the catalyst device 202 by inputting electric power corresponding to input electric power E set in this routine.

When this routine starts, first, the control device 10 calculates a travel load W from the vehicle speed V and the accelerator pedal operation amount ACC in Step S200. In the EV travel mode, the motor 21 alone generates a driving force for the hybrid vehicle. The travel load W is an index value indicating the magnitude of a load of the motor 21. In this embodiment, power consumption of the motor 21 is used as the value of the travel load W.

Subsequently, in Step S210, the control device 10 calculates an optimal power-supply state of charge SOP based on the travel load W calculated in Step S200. The optimal power-supply state of charge SOP is calculated as the following value. Here, it is assumed that the travel load W is maintained at a current value up to starting of the HV travel mode. It is assumed that a pre-heating process is performed such that the catalyst temperature TMP reaches the catalyst activation temperature TMP1 at the same time as starting of the HV travel mode. The optimal power-supply state of charge SOP represents the state of charge SOC of the main battery 22 at the time of starting of supply of electric power to the catalyst device 202 in the pre-heating process at that time. The optimal power-supply state of charge SOP is greater than the mode-switching state of charge SHV.

As will be described later, in this embodiment, the input electric power E of the catalyst device 202 at the time of starting of the pre-heating process is set such that the catalyst temperature TMP reaches the catalyst activation temperature TMP1 by supply of electric power for a predetermined time. In the following description, the predetermined time is referred to as a required power supply time HT. In this case, when supply of electric power to the catalyst device 202 is started in the required power supply time HT prior to starting of the HV travel mode, it is thought that the catalyst temperature TMP reaches the catalyst activation temperature TMP1 at the same time as starting of the HV travel mode. When the travel load W is maintained in the current value up to starting of the HV travel mode, the power consumption of the motor 21 from starting of supply of electric power to starting of the HV travel mode is a product of the current value of the travel load W and the required power supply time HT. Therefore, in this embodiment, a value (=SHV+W×HT) obtained by adding the product of the current value of the travel load W and the required power supply time HT to the mode-switching state of charge SHV is calculated as the value of the optimal power-supply state of charge SOP.

When the optimal power-supply state of charge SOP is calculated in this way, the control device 10 determines whether the power supply flag is cleared in Step S220. As will be described later, the power supply flag is a flag which is set up at the time of starting of the supply of electric power to the catalyst device 202 in the pre-heating process and which is cleared at the time of stopping of the supply of electric power. That is, in Step S220, it is determined whether the supply of electric power to the catalyst device 202 is being performed. The control device 10 causes the routine to proceed to Step S230 when the power supply flag is cleared (YES) and causes the routine to proceed to Step S300 in FIG. 4 when the power supply flag is set up (NO). That is, the processes subsequent to Step S230 in FIG. 3 are a routine which is performed when the supply of electric power to the catalyst device 202 is not being performed. The processes subsequent to Step S300 in FIG. 4 are a routine which is performed when the supply of electric power to the catalyst device 202 is being performed.

The routine when the supply of electric power is not being performed will be first described below. When the routine proceeds to Step S230, the control device 10 determines whether the current state of charge SOC of the main battery 22 is equal to or less than the optimal power-supply state of charge SOP in Step S230. When the current state of charge SOC is equal to or less than the optimal power-supply state of charge SOP (YES), the control device 10 causes the routine to proceed to Step S240. On the other hand, when the current state of charge SOC is greater than the optimal power-supply state of charge SOP (NO), the control device 10 ends this routine without performing any more process.

When the routine proceeds to Step S240, the control device 10 determines whether the catalyst temperature TMP is less than the cleaning start temperature TMP2 in Step S240. When the catalyst temperature TMP is less than the cleaning start temperature TMP2 (YES), the control device 10 causes the routine to proceed to Step S250. On the other hand, when the catalyst temperature TMP is equal to or greater than the cleaning start temperature TMP2 (NO), the control device 10 ends this routine without performing any more process.

When the routine proceeds to Step S250, the control device 10 sets up the power supply flag in Step S250. Subsequently, in Step S260, the control device 10 sets the value of the current optimal power-supply state of charge SOP as a value of a power-supply initial value S0. Subsequently, in Step S270, the control device 10 calculates an initial input electric power E0 based on the current catalyst temperature TMP. When supply of electric power is performed for the required power supply time HT in a state in which the input electric power E is kept constant, the control device 10 calculates a value of the input electric power E at which the catalyst temperature TMP can increase from the current value to the catalyst activation temperature TMP1 as the value of the initial input electric power E0. Specifically, first, the control device 10 calculates an amount of electric power required for increasing the catalyst temperature TMP from the current value to the catalyst activation temperature TMP1. In the following description, the amount of electric power required for the increase to the catalyst activation temperature TMP1 is referred to as a required amount of electric power P. The control device 10 calculates a quotient obtained by dividing the required amount of electric power P by the required power supply time HT as the value of the initial input electric power E0 (E0=P/HT). Subsequently, in Step S280, the control device 10 sets the initial input electric power E0 as the input electric power E of the catalyst device 202 and ends this routine. As described above, the control device 10 starts supply of electric power to the catalyst device 202 when the state of charge SOC of the main battery 22 is equal to or less than the optimal power-supply state of charge SOP and the catalyst temperature TMP is less than the cleaning start temperature TMP2.

The routine when the supply of electric power is being performed will be described below. At this time, the control device 10 causes the routine to proceed to Step S300 in FIG. 4 as described above. When the routine proceeds to Step S300, the control device 10 determines whether the catalyst temperature TMP is less than the catalyst activation temperature TMP1 in Step S300. When the catalyst temperature TMP is less than the catalyst activation temperature TMP1 (YES), the control device 10 causes the routine to proceed to Step S320. On the other hand, when the catalyst temperature TMP is equal to or greater than the catalyst activation temperature TMP1 (NO), the control device 10 causes the routine to proceed to Step S310. In Step S310, the control device 10 clears the power supply flag and ends this routine. That is, the control device 10 stops supply of electric power to the catalyst device 202 when the catalyst temperature TMP reaches the catalyst activation temperature TMP1 and full warm-up of the catalyst device 202 is completed after the supply of electric power has been started.

On the other hand, when the routine proceeds to Step S310, the control device 10 determines whether a difference ΔS (=S0−SOP) obtained by subtracting the optimal power-supply state of charge SOP from the power-supply initial value S0 is less than a stop determination value ΔS1 in Step S310. The stop determination value ΔS1 is set to a predetermined positive value. When the difference ΔS is less than the stop determination value ΔS1 (YES), the control device 10 causes the routine to proceed to Step S330. On the other hand, when the difference ΔS is equal to or greater than the stop determination value ΔS1 (NO), the control device 10 causes the routine to proceed to Step S310. Accordingly, in this case, the power supply flag is cleared and supply of electric power to the catalyst device 202 is stopped. That is, electric heating of the catalyst device 202 is stopped in a state in which full warm-up has not been completed.

The power-supply initial value S0 represents a value of the optimal power-supply state of charge SOP at the time of starting of the supply of electric power. The optimal power-supply state of charge SOP is calculated whenever this routine is performed. Accordingly, when the travel load W changes after the supply of electric power has been started, the value of the optimal power-supply state of charge SOP also changes from the value at the time of starting of the supply of electric power. The value of the optimal power-supply state of charge SOP decreases as the travel load W decreases. Accordingly, when the travel load W decreases greatly after the supply of electric power has been started, the supply of electric power to the catalyst device 202 is stopped.

On the other hand, when the routine proceeds to Step S330, the control device 10 determines whether the difference ΔS is less than a predetermined erroneous prediction determination value ΔS2 in Step S330. The erroneous prediction determination value ΔS2 is set to a positive value less than the stop determination value ΔS1. When the difference ΔS is less than the erroneous prediction determination value ΔS2 (YES), the control device 10 sets the initial input electric power E0 as the value of the input electric power E in Step S340 and ends this routine. On the other hand, when the difference ΔS is equal to or greater than the erroneous prediction determination value ΔS2 (NO), the control device 10 causes the routine to proceed to Step S350. Then, the control device 10 calculates a value satisfying a relationship of Expression (1) as the value of the input electric power E in Step S350 and ends this routine. The value of the input electric power E satisfying the relationship of Expression (1) is the input electric power E required for increasing the temperature of the catalyst device 202 to the catalyst activation temperature TMP1 at the time of starting of the HV travel mode delayed due to the decrease in travel load W.

$$E = E0 \times \frac{S0 - SOP}{S0 - SHV} \quad (1)$$

Operations and Advantages of Embodiment

Operations and advantages of this embodiment having the aforementioned configuration will be described below.

Figure 5:
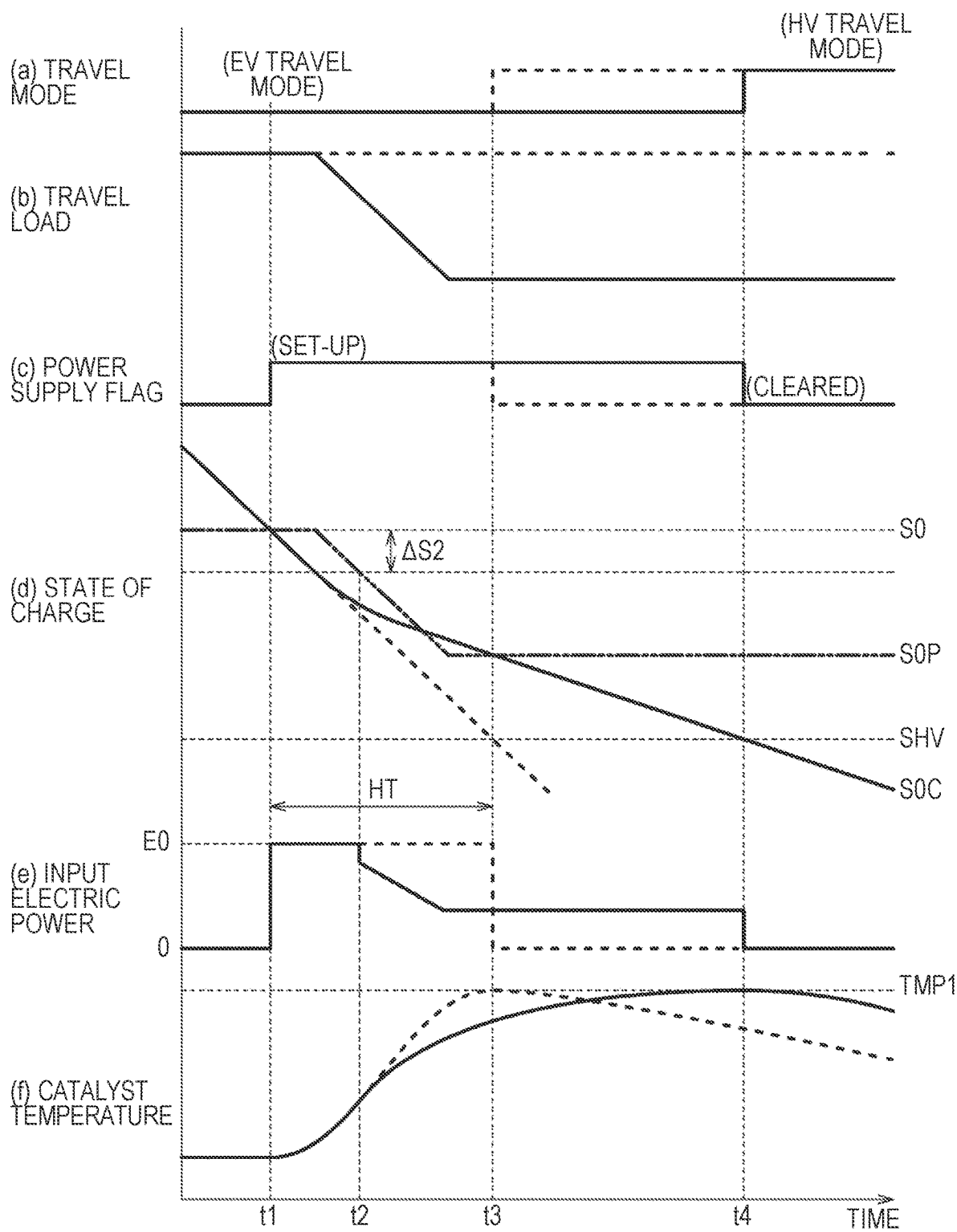
FIG. 5 is a timing chart illustrating changes when a travel load decreases after supply of electric power has been started, where a portion (a) of FIG. 5 illustrates a change of a travel mode, a portion (b) of FIG. 5 illustrates a change of a travel load, a portion (c) of FIG. 5 illustrates a change of a power supply flag, a portion (d) of FIG. 5 illustrates a change of a state of charge and an optimal power-supply state of charge, a portion (e) of FIG. 5 illustrates a change of input electric power of a catalyst device, and a portion (f) of FIG. 5 illustrates a change of a catalyst temperature.

FIG. 5 illustrates an example of the power supply control according to this embodiment when the travel load W decreases after supply of electric power has been started. A portion (a) of FIG. 5 illustrates a change of the travel mode, a portion (b) of FIG. 5 illustrates a change of the travel load W, and a portion (c) of FIG. 5 illustrates a change of the power supply flag. A portion (d) of FIG. 5 illustrates changes of the state of charge SOC and the optimal power-supply state of charge SOP of the main battery 22, a portion (e) of FIG. 5 illustrates a change of the input electric power E of the catalyst device 202, and a portion (f) of FIG. 5 illustrates a change of the catalyst temperature TMP. In FIG. 5, changes of the travel mode, the travel load W, the power supply flag, the state of charge SOC, the input electric power E, and the catalyst temperature TMP when the travel load W does not change after supply of electric power has been started are indicated by dotted lines.

In FIG. 5, at time t1, the state of charge SOC of the main battery 22 becomes equal to or less than the optimal power-supply state of charge SOP and the power supply flag is set up. When the travel load W is maintained in the value at time t1 after the supply of electric power has been started, the state of charge SOC of the main battery 22 decreases to the mode-switching state of charge SHV at time t3 in FIG. 5. At time t3, the travel mode is switched from the EV travel mode to the HV travel mode. At time t1, the input electric power E is set such that the catalyst temperature TMP reaches the catalyst activation temperature TMP1 at time t3 which is a timing at which the HV travel mode is started and which is predicted from the current travel load W, and supply of electric power to the catalyst device 202 is started.

In FIG. 5, the travel load W decreases after time t1 at which the supply of electric power has been started. When the travel load W decreases, the power consumption of the motor 21 decreases and thus a rate of decrease of the state of charge SOC decreases. Accordingly, at time t4 which is later than time t3 predicted at the time of starting of the supply of electric power, the state of charge SOC decreases to the mode-switching state of charge SHV and the HV travel mode is started. On the other hand, when the input electric power E of the catalyst device 202 is maintained in the value at the time of starting of the supply of electric power, the catalyst temperature TMP reaches the catalyst activation temperature TMP1 at time t3 and the supply of electric power to the catalyst device 202 is stopped. Accordingly, in this case, there is concern that the catalyst temperature TMP will decrease before the HV travel mode is started.

When the catalyst temperature TMP decreases to less than the cleaning start temperature TMP2 after the supply of electric power has been stopped, re-supply of electric power to the catalyst device 202 is performed. Accordingly, the catalyst temperature TMP at the time of starting of the HV travel mode becomes equal to or greater than the cleaning start temperature TMP2 and the exhaust gas cleaning ability is secured to some extent when the engine 20 is started. However, when re-supply of electric power is performed, power consumption increases by that and efficiency of electric heating decreases.

On the other hand, the control device 10 recalculates the optimal power-supply state of charge SOP based on the travel load W from time to time even after the supply of electric power has been started. When the recalculated value of the optimal power-supply state of charge SOP is less than the value calculated at the time of starting of the supply of electric power, starting of the HV travel mode is delayed more than predicted at the time of starting of the supply of electric power. Therefore, when the difference ΔS obtained by subtracting the optimal power-supply state of charge SOP from the power-supply initial value S0 is equal to or greater than the erroneous prediction determination value ΔS2, the control device 10 corrects the input electric power E. In the example illustrated in FIG. 5, at time t2, the difference ΔS becomes equal to or greater than the erroneous prediction determination value ΔS2 and the input electric power E is corrected to a value less than the initial input electric power E0. Thereafter, correction of the input electric power E is also performed according to the change of the travel load W. Accordingly, supply of electric power to the catalyst device 202 is performed such that the catalyst temperature TMP reaches the catalyst activation temperature TMP1 at time t4 at which the HV travel mode is started.

When the travel load W decreases after the supply of electric power has been started and a decrease width thereof is small, a delay time of the start timing of the HV travel mode from the timing predicted at the time of starting of the supply of electric power decreases. In this case, even when the input electric power E is maintained in the initial input electric power E0 and the supply of electric power is performed, the HV travel mode is started immediately after warm-up of the catalyst device 202 has been completed. Accordingly, when the difference ΔS is less than the erroneous prediction determination value ΔS2, that is, when the decrease of the travel load W after the supply of electric power has been started is small, the control device 10 does not correct the input electric power E but maintains the input electric power E in the initial input electric power EU.

After the supply of electric power has been started, the hybrid vehicle stops or the like and thus the travel load W may decrease greatly. When the input electric power E is corrected based on the decrease of the travel load W in this case, energy dissipated from the catalyst device 202 due to emission of heat to the outside air the like may be greater than the input electric power E and the catalyst temperature TMP may not be able to increase more. Accordingly, the control device 10 stops the supply of electric power to stop electric heating when the difference ΔS becomes equal to or greater than the stop determination value ΔS1 after the supply of electric power has been started.

In this embodiment, the travel mode switching control routine illustrated in FIG. 2 corresponds to a switching process. The power supply control routine illustrated in FIGS. 3 and 4 corresponds to a pre-heating process. In the power supply control routine, the process of Step S210 in FIG. 3 corresponds to a calculation process, and the processes of Steps S340 and S350 in FIG. 4 correspond to a correction process.

With the control device 10 for a hybrid vehicle according to this embodiment, the following advantages can be achieved.

(1) The control device 10 performs the pre-heating process of supplying electric power to the catalyst device 202 before the travel mode is switched from the EV travel mode to the HV travel mode. In the pre-heating process, the control device 10 sets the input electric power E at the time of starting of the supply of electric power such that the catalyst temperature TMP reaches the catalyst activation temperature TMP1 at the starting timing of the HV travel mode predicted based on the travel load W. On the other hand, when the travel load W decreases after the supply of electric power to the catalyst device 202 has been started, the control device 10 corrects the input electric power E such that it has a value less than that at the time of starting of the supply of electric power. When the travel load W decreases after the supply of electric power has been started, the start timing of the HV travel mode is later than the timing predicted at the time of starting of the supply of electric power. When the input electric power E is decreased, the timing at which full warm-up of the catalyst device 202 is completed by electric heating is delayed. Accordingly, even when the travel load W decreases after the supply of electric power has been started, the timing at which full warm-up of the catalyst device 202 is completed by electric heating and the start timing of the HV travel mode are not much separated from each other. As a result, it is possible to enhance electric heating efficiency of the catalyst device 202.

(2) A value satisfying the relationship of Expression (1) is set as a correction value of the input electric power E when the travel load W decreases after the supply of electric power has been started. Accordingly, power supply control can be performed such that full warm-up of the catalyst device 202 to the catalyst activation temperature TMP1 is completed at the start timing of the HV travel mode delayed due to the decrease of the travel load W.

(3) When the difference ΔS obtained by subtracting the recalculated value of the optimal power-supply state of charge SOP from the power-supply initial value S0 is equal to or greater than the stop determination value ΔS1 after the supply of electric power has been started, the control device 10 stops the supply of electric power to the catalyst device 202. Accordingly, when starting of the HV travel mode is much delayed due to the large decrease of the travel load W after the supply of electric power has been started, unnecessary supply of electric power does not continue to be performed.

(4) Even when the state of charge SOC of the main battery 22 is equal to or less than the mode-switching state of charge SHV, the control device 10 does not start the HV travel mode until the catalyst temperature TMP becomes equal to or greater than the cleaning start temperature TMP2. Accordingly, the engine 20 is not started in a state in which the catalyst device 202 develops the exhaust gas cleaning ability.

This embodiment can be modified as follows. This embodiment and the following modified examples can be combined unless technical conflictions arise. A calculation map in which the value of the input electric power E satisfying the relationship of Expression (1) is stored for each combination of two values including the power-supply initial value S0 and the recalculated value of the optimal power-supply state of charge SOP is stored in advance in the ROM of the control device 10. Calculation of the correction value of the input electric power E in Step S350 in FIG. 4 may be performed using the calculation map.

In the aforementioned embodiment, the travel load W is calculated based on the vehicle speed V and the accelerator pedal operation amount ACC, but the travel load W may be calculated based on other parameters such as a generated torque, a voltage, and a current of the motor 21.

In the aforementioned embodiment, the initial input electric power E0 is set to be variable according to the catalyst temperature TMP, but the initial input electric power E0 may be set to a fixed value regardless of the catalyst temperature TMP.

In the aforementioned embodiment, the situation in which partial warm-up of the catalyst device 202 has been completed is added to the conditions for switching the travel mode from the EV travel mode to the HV travel mode. Completion of full warm-up instead of partial warm-up may be added to the switching conditions. Completion of partial warm-up or full warm-up may not be added to the switching conditions.

In the aforementioned embodiment, when the difference ΔS is less than the stop determination value ΔS1 after the supply of electric power has been started, that is, when the travel load W decreases greatly, the supply of electric power to the catalyst device 202 is stopped in a state in which the full warm-up has not been completed. This process of stopping the supply of electric power may be omitted.

In the aforementioned embodiment, a value satisfying the relationship of Expression (1) is set as the correction value of the input electric power E when the travel load W decreases after the supply of electric power has been started, but the correction value may be calculated using another method. In this case, by setting the correction value such that the input electric power E is less when the difference ΔS is large than when the difference ΔS is small, it is also possible to enhance the electric heating efficiency. The correction value of the input electric power E may also be calculated based on the travel load W without using the recalculated value of the optimal power-supply state of charge SOP. In any way, when the travel load W decreases in comparison with that at the time of starting of the supply of electric power, it is possible to enhance the electric heating efficiency by correcting the input electric power E such that it is less than that at the time of starting of the supply of electric power.

A hybrid vehicle including an engine travel mode in which only the engine 20 is used as the traveling power source instead of the HV travel mode can be considered. When the control device according to the aforementioned embodiment is applied to such a hybrid vehicle, the HV travel mode in the aforementioned embodiment is replaced with the engine travel mode. In this case, the same operations and advantages as in the aforementioned embodiment can be achieved by employing the power supply control routine according to the embodiment. In this case, the engine travel mode is a travel mode corresponding to the second travel mode.

A hybrid vehicle including three travel modes of the EV travel mode, the HV travel mode, and the engine travel mode can also be considered. In such a hybrid vehicle, switching to any one of the HV travel mode and the engine travel mode is performed in Step S120 of the travel mode switching control routine. In this case, the same operations and advantages as in the aforementioned embodiment can be achieved by employing the power supply control routine. In this case, both the HV travel mode and the engine travel mode are travel modes corresponding to the second travel mode.

What is claimed is:

1. A method for a hybrid vehicle including an engine in which an electrically heated type catalyst device that is heated with supply of electric power is provided in an exhaust gas passage and a motor that generates power with supply of electric power from a battery as traveling power sources and having a first travel mode in which only the motor is used as the traveling power source and a second travel mode in which at least the engine is used as the traveling power source as travel modes, the method comprising:
    a switching process of switching the travel mode to the second travel mode when a state of charge of the battery is equal to or less than a predetermined mode-switching state of charge while the hybrid vehicle is traveling in the first travel mode;
    a pre-heating process of starting supply of electric power to the catalyst device when the state of charge of the battery is equal to or less than an optimal power-supply state of charge greater than the mode-switching state of charge, the pre-heating process being a process of performing electric heating of the catalyst device while the hybrid vehicle is traveling in the first travel mode;
    a calculation process of calculating a first value SOP1 of the optimal power-supply state of charge at a start of supplying electric power to the catalyst device according to equation SOP1=SHV+W1×HT, wherein SOP1 is the first value of the optimal power-supply state of charge, SHV represents the predetermined mode-switching state of charge, W1 represents a travel load of the hybrid vehicle, and HT represents a predetermined time during which the electric power is supplied to the catalyst device until a catalyst temperature reaches a catalyst activation temperature; and
    a correction process of:
        calculating a second value SOP2 of the optimal power-supply state of charge after the supply of the electric power to the catalyst device has been started according to equation SOP2=SHV+W2×HT, wherein SOP2 is the second value of the optimal power-supply state of charge, SHV represents the predetermined mode-switching state of charge, W2 represents a travel load of the hybrid vehicle after the supply of the electric power to the catalyst device has been started, and HT represents a predetermined time during which the electric power is supplied to the catalyst device until a catalyst temperature reaches a catalyst activation temperature,
        calculating a decreased input electric power according to
            E=E0×(SOP1−SOP2)/(SOP1−SHV), wherein E is the decreased input electric power, and E0 is an initial input electric power, and
        decreasing input electric power of the catalyst device based on the decreased input electric power.

2. The method according to claim 1, wherein the pre-heating process includes stopping supply of the electric power to the catalyst device when a difference between the first value SOP1 and the second value SOP2 is greater than a predetermined stop determination value.

3. The method according to claim 1, wherein the switching process includes switching the travel mode to the second travel mode at the time of completion of warm-up of the catalyst device by the electric heating when the state of charge is equal to or less than the mode-switching state of charge and the warm-up of the catalyst device has not been completed.

4. The method according to claim 1, wherein the travel load is calculated based on a speed of the hybrid vehicle and an accelerator pedal operation amount.

5. The method according to claim 1, further comprising:
    in response to a difference between the first value SOP1 and the second value SOP2 being less than a stop determination value after the supply of the electric power has been started, stopping the supply of the electric power to the catalyst device in a state in which a full warm-up of the catalyst device has not been completed.

* * * * *